(12) United States Patent
Feng

(10) Patent No.: US 10,977,473 B1
(45) Date of Patent: Apr. 13, 2021

(54) TOUCH DISPLAY PANEL AND TOUCH DISPLAY DEVICE WITH FINGERPRINT IDENTIFICATION FUNCTION

(71) Applicant: Wuhan China Star Optoelectronics Semiconductor Display Technology Co., Ltd., Wuhan (CN)

(72) Inventor: Xiaoliang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/897,310

(22) Filed: Jun. 10, 2020

(30) Foreign Application Priority Data

Jan. 8, 2020 (CN) .......................... 202010016647.9

(51) Int. Cl.
G06K 9/00 (2006.01)
G06F 3/044 (2006.01)

(52) U.S. Cl.
CPC .......... G06K 9/0002 (2013.01); G06F 3/0446 (2019.05); *G06F 2203/04111* (2013.01)

(58) Field of Classification Search
CPC .......... G06F 3/0446; G06F 2203/04111; G06K 9/0002
See application file for complete search history.

(56) References Cited

U.S. PATENT DOCUMENTS

| | | | |
|---|---|---|---|
| 2018/0035923 A1* | 2/2018 | Kang | A61B 5/117 |
| 2018/0039349 A1* | 2/2018 | Han | G06F 3/04164 |
| 2018/0059452 A1* | 3/2018 | Jang | G02F 1/1343 |
| 2018/0068156 A1* | 3/2018 | Jang | G06K 9/0002 |
| 2018/0211082 A1* | 7/2018 | Choi | G06F 3/0446 |
| 2019/0212840 A1* | 7/2019 | Zhang | G06F 3/041 |
| 2019/0294846 A1* | 9/2019 | Li | G06K 9/0002 |
| 2021/0004124 A1* | 1/2021 | Park | G06F 3/0448 |

\* cited by examiner

*Primary Examiner* — Ryan A Lubit
(74) *Attorney, Agent, or Firm* — Nathan & Associates; Menachem Nathan

(57) ABSTRACT

The present invention provides a touch display panel with a fingerprint identification function, which includes a substrate, and touch electrodes, a first insulating layer, a conductive layer, a second insulating layer, a fingerprint identification layer, and a protective layer which are sequentially disposed on the substrate, wherein the fingerprint identification layer is a conductor grid with a high light transmittance formed by staggering a plurality of wires, the fingerprint identification layer includes a plurality of fingerprint identification leads, and the conductive layer includes a plurality of fingerprint identification traces. Through the conductor grid with high light transmittance, fingerprint identification can be integrated into the touch display panel without impacting the display, and via holes are provided on the second insulating layer to realize the electrical connection between the plurality of fingerprint identification leads and the plurality of fingerprint identification traces, thereby making the most of the conductive layer.

10 Claims, 2 Drawing Sheets

TOUCH DISPLAY PANEL AND TOUCH DISPLAY DEVICE WITH FINGERPRINT IDENTIFICATION FUNCTION

BACKGROUND OF INVENTION

Field of Invention

The present invention relates to a field of fingerprint identification, and in particular, to a touch display panel and a touch display device with a fingerprint identification function.

Description of Prior Art

Current fingerprint identification technologies are mainly divided into three types: ultrasonic fingerprint identification, optical fingerprint identification, and capacitive fingerprint identification. All three types of the fingerprint identification technologies perform identification by using ridges and valleys of a fingerprint to produce different feedback effects to a same detection signal, wherein an ultrasonic sensor has the problems of a low identification rate and a slow identification speed, while the optical fingerprint identification is difficult to apply to smaller thickness devices such as smartphones because the optical fingerprint identification has a large-volume optical system with a large optical path system, and existing capacitive fingerprint identification usually uses a plug-in method to collect user's fingerprint information, and additionally designs an identification module outside the touch screen, such as a home button or a back of a mobile phone, since it is technically difficult to integrate a fingerprint recognition array into a touch screen.

SUMMARY OF INVENTION

An object of the present invention is to provide a touch display panel and a touch display device with a fingerprint identification function, so as to integrate fingerprint identification in the touch display panel.

In order to achieve the above object, a first aspect of the present invention provides a touch display panel with a fingerprint identification function including:

a substrate;

touch electrodes disposed on the substrate and includes a plurality of first touch electrodes and a plurality of second touch electrodes, wherein adjacent ones of the first touch electrodes are electrically connected to each other, adjacent ones of the second touch electrodes are electrically connected to each other, and the plurality of first touch electrodes and the plurality of second touch electrodes are staggered and insulated from each other;

a first insulating layer covering the substrate and the touch electrodes;

a conductive layer disposed on the first insulating layer and including a bridge line layer and a plurality of fingerprint identification traces, wherein the bridge line layer is configured to electrically connect the adjacent ones of the first touch electrodes;

a second insulating layer covering the conductor layer and the first insulating layer;

a fingerprint identification layer disposed on the second insulating layer and including a fingerprint identification array and a plurality of fingerprint identification leads, wherein the fingerprint identification array has a plurality of fingerprint identification units, and each of the fingerprint identification leads is electrically connected to at least one of the plurality of the fingerprint identification units; and a protective layer disposed on the fingerprint identification layer, wherein the second insulating layer is provided with via holes at positions corresponding to each of the fingerprint identification traces, and the plurality of fingerprint identification leads are electrically connected to the plurality of fingerprint identification traces through the via holes.

Further, the substrate is a thin film transistor array substrate.

Further, each of the fingerprint identification units has a conductor grid constituted by staggering a plurality of wires.

Further, a side length of the fingerprint identification array is not less than 1.5 cm.

Further, a side length of the conductor grid is not greater than 50 microns.

Further, the conductor grid is made of a material selected from one or an alloy of magnesium, aluminum, titanium, niobium, neodymium, copper, and silver.

Further, the first touch electrodes and the second touch electrodes are made of a material selected from one of indium tin oxide, indium gallium zinc oxide, indium zinc oxide, and indium gallium oxide.

Further, the conductor grid is connected to at least one fingerprint identification pin to assist in connecting each of the fingerprint identification leads to the conductor grid in each of the fingerprint identification units.

Further, each of the touch electrodes is one of a self-capacitive touch electrode or a capacitive touch electrode.

A second aspect of the present invention provides a touch display device, wherein the touch display device includes the above-mentioned touch display panel with a fingerprint identification function.

The present invention integrates fingerprint identification into a touch display panel through a conductor grid with high light transmittance, and realizes a touch panel with a fingerprint identification function. Furthermore, in addition to using a conductive layer as the bridge line layer of adjacent ones of the first touch electrodes, a plurality of fingerprint identification leads in connection with the fingerprint identification array are electrically connected to a plurality of fingerprint identification traces by forming via holes in the second insulating layer, and are connected to a binding area for fingerprint identification, to make the most of the conductive layer. It can be seen that the present invention has a high degree of industrial applicability, and its inventive step is very significant.

DETAILED DESCRIPTION OF PREFERRED EMBODIMENTS

Figure 1:
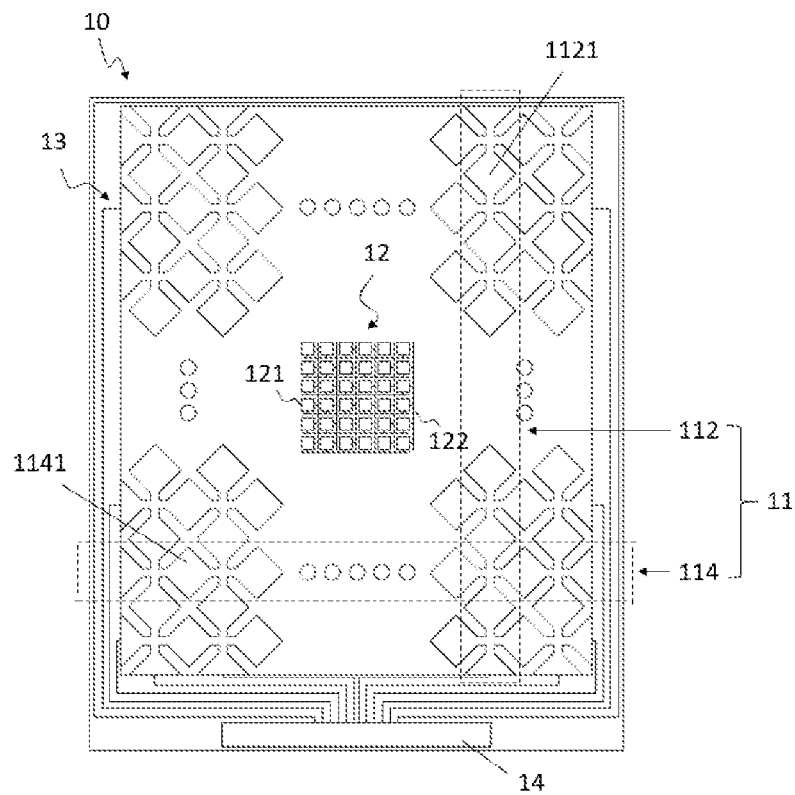
FIG. 1 is a schematic diagram of a touch display panel with a fingerprint identification function according to an embodiment of the present invention.

In order to make the purpose, technical solution and effect of the present invention more clear and definite, the following is described with reference to the accompanying drawings.

The examples further illustrate the present invention. It should be understood that the specific embodiments described herein are only used to explain the present invention, and the term "embodiment" used in the description of the present invention is meant to be used as an example or illustration, and should not be construed as limiting the present invention. In addition, terminology used herein is for the purpose of describing particular embodiments only and is not intended to limit the exemplary embodiments. Unless the context clearly indicates otherwise, as used herein, the singular form "a" is also intended to include a plural form.

In the description of the present invention, it is to be understood that the terms "top", "bottom" and the like are based on the orientation or positional relationship shown in the drawings, and is merely for the convenience of describing the present invention and simplifying the description, and does not indicate or imply that the indicated devices or components must to be in particular orientations, or constructed and operated in a particular orientation, and thus are not to be construed as limiting the present invention. Furthermore, the terms "first", "second", etc. in the specification and claims of the present invention and the above figures are used to distinguish similar objects, and are not necessarily used to describe a specific order or prioritization. It should be understood that the objects so described are interchangeable when it is appropriate.

For the convenience of explanation, unless otherwise indicated or explained, the following "first touch electrode chain", "second touch electrode chain", "first touch electrode", "second touch electrode", "fingerprint identification wiring" and "fingerprint identification lead" may include a case of plural.

Please refer to FIG. 1, which is a schematic diagram of a touch display panel 10 with a fingerprint identification function according to an embodiment of the present invention. A display area (not shown) of the touch display panel 10 with a fingerprint identification function is provided with touch electrodes 11 and a fingerprint identification layer 12. The fingerprint identification layer 12 includes a fingerprint identification array 121 and a plurality of fingerprint identification leads 122. In order to simplify the illustration, only a part of the fingerprint identification lead 122 is shown in FIG. 1 for exemplary.

In this embodiment, the touch electrodes 11 include a plurality of first touch electrode chains 112 arranged along a first direction and a plurality of second touch electrode chains 114 arranged along a second direction intersecting the first direction, wherein each of the first touch electrode chains 112 is composed of a plurality of the first touch electrodes 1121 electrically connected to each other, and each of the second touch electrode chains 114 is composed of a plurality of the second touch electrodes 1141 electrically connected to each other.

Further, the first touch electrode chains 112 and the second touch electrode chains 114 are staggered and insulated from each other, that is, the places where the first touch electrode chains 112 and the second touch electrode chains 114 intersect with each other, as shown in FIG. 1, are not in electrical connection. It can be understood that the first touch electrodes 1121 and the second touch electrodes 1141 are insulated from each other. In an embodiment, the first direction and the second direction are a column direction and a row direction, respectively, and the touch electrodes 11 are made of a transparent conductive material such as indium tin oxide (ITO), indium gallium zinc oxide (IGZO), indium zinc oxide (IZO), indium gallium oxide (IGO), etc.

In this embodiment, a non-display area (not shown) of the touch display panel 10 with a fingerprint identification function is provided with a plurality of touch traces 13, wherein each of the first touch electrode chains 112 the second touch electrode chains 114 is connected to one end of each of the touch traces 13 respectively, and the other end of the touch trace 13 is connected to the binding area 14 which is connected to a control integrated circuit (not shown) for analyzing and interpreting a touch signal. A type of the touch electrodes 11 may be self-capacitive or mutual-capacitive. When no conductive object (such as a finger) contacts the touch electrodes 11, coupling capacitor (Cp) with a fixed power line (electric field) distribution is formed between the first touch electrodes 1121 and the second touch electrodes 1141 adjacent thereto. Optionally, if the touch electrodes 11 are self-capacitive touch electrodes, since the self-capacitive touch electrodes are configured to sense the change in capacitance values of the entire first touch electrode chains 112 or the entire second touch electrode chains 114, when a conductive object contacts the touch electrodes 11, the capacitance values of the first touch electrode chains 112 and the second touch electrode chains 114 that are contacted will increase, so as to recognize which ones of the first touch electrode chains 112 and the second touch electrode chains 114 change in the capacitance value, thereby determining a contact position of the conductive object. Optionally, if the touch electrodes 11 are mutual-capacitance touch electrodes, since the mutual-capacitance touch electrodes are configured to sense the change in capacitance values of the first touch electrodes 1121 and the second touch electrodes 1141 adjacent thereto, when a conductive object contacts the touch electrodes 11, the capacitance values of the first touch electrodes 1121 and the second touch electrodes 1141 adjacent to the first touch electrodes 1121 will decrease, so as to recognize which ones of the first touch electrodes 1121 and the second touch electrodes 1141 adjacent to the first touch electrodes change in the capacitance value, thereby determining a contact position of the conductive object. As such, the mutual-capacitive touch electrodes can realize multi-touch compared to the self-capacitive touch electrodes.

In this embodiment, the fingerprint identification array 121 and the touch electrodes 11 are correspondingly arranged to form an array with a side length greater than or equal to (i.e., not less than) 1.5 cm, and a specific location of the fingerprint identification array 121 can be set according to requirements, and is not limited to the places shown in FIG. 1. When the fingerprint identification array 121 and the touch electrodes 11 are correspondingly arranged to have the same size, full-screen fingerprint identification can be achieved. It can be understood that the size of the fingerprint identification array 121 is only a preferred size provided by the present invention, and should not be construed as a limitation on the present invention. It is necessary to point out that FIG. 1 is a schematic top view of a touch display panel 10 with a fingerprint identification function provided by the present invention, and is only used for explanation and illustration, and thus the touch electrodes 11, the fingerprint recognition layer 12 or the fingerprint recognition array 121 therein, the plurality of touch traces 13, and the binding region 14 should not be interpreted as being located in the same layer.

Figure 2:
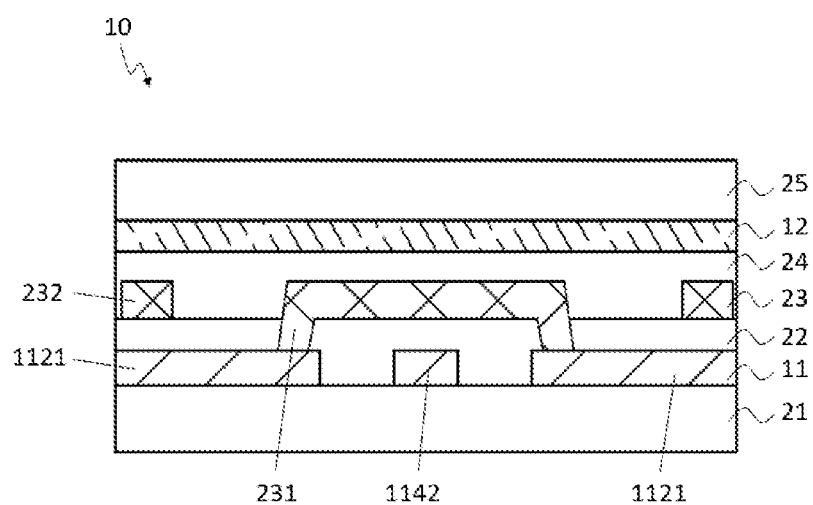
FIG. 2 is a stacking diagram of a touch display panel with a fingerprint identification function on a display area according to an embodiment of the present invention.

With reference to FIG. 2, FIG. 2 is a stacking diagram of a touch display panel 10 with a fingerprint identification function provided on the display area according to an embodiment of the present invention. It can be understood that the stacking diagram in FIG. 2 is a side view showing the fingerprint identification layer 12 disposed correspondingly, and for convenience of explanation, FIG. 2 only shows a partial schematic diagram in one direction for explanation. In the display area, the touch display panel 10 with a fingerprint identification function includes a substrate 21, and touch electrodes 11, a first insulating layer 22, a conductive layer 23, a second insulating layer 24, a fingerprint identification layer 12, and a protective layer 25 which are sequentially disposed on the substrate 21.

In this embodiment, the substrate 21 may be made of a material such as glass, polyethylene terephthalate (PET), cycloolefin polymer (COP), and polyimide (PI), or may be a thin film transistor array substrate. In an embodiment, the substrate 21 is an encapsulation layer of an electroluminescent element (such as an OLED), that is, the touch electrodes 11, the first insulating layer 22, the conductive layer 23, the second insulating layer 24, the fingerprint identification layer 12, and the protective layer 25 are sequentially disposed on the encapsulation layer.

In this embodiment, the touch electrodes 11 are formed into a plurality of first touch electrodes 1121 and a plurality of second touch electrodes 1141 staggered on the substrate 21 by development and etching processes, and the conductive layer 23 is formed into a bridge line layer 231 and a plurality of fingerprint identification traces 232 on the first insulating layer 22 covering the touch electrodes 11 by development and etching processes. Adjacent ones of the second touch electrodes 1141 are electrically connected to each other through the bridge line layer 231. The plurality of first touch electrodes 1121 and the plurality of second touch electrodes 1141 are insulated from each other through the first insulating layer 22, adjacent ones of the first touch electrodes 1121 are electrically connected to each other through the bridge line layer 231, and a bridge portion 1142 can be formed between adjacent ones of the second touch electrodes 1141 when the touch electrodes 11 are formed into the plurality of first touch electrodes 1121 and the plurality of second touch electrodes 1141 by development and etching processes, to electrically connect the adjacent ones of the second touch electrodes 1141 to each other.

Figure 3:
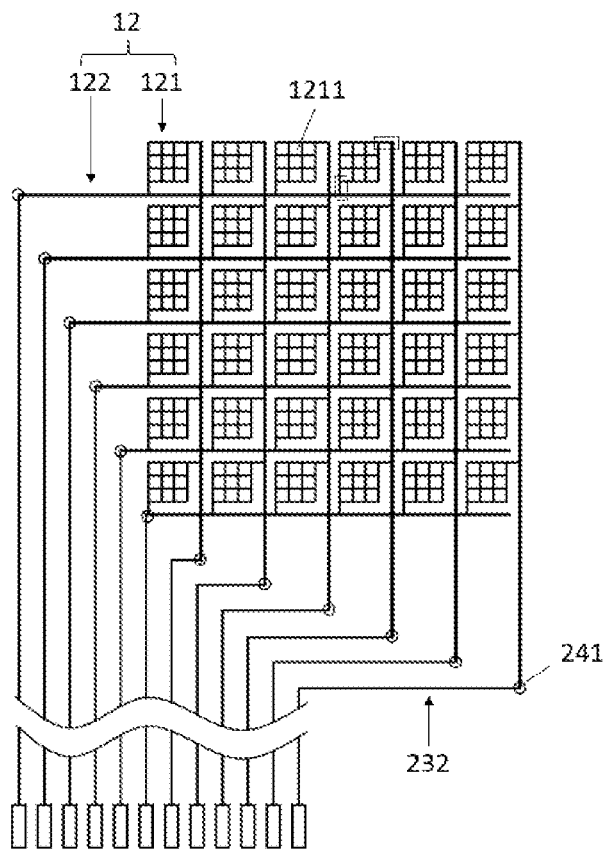
FIG. 3 is a schematic diagram of a fingerprint identification layer according to an embodiment of the present invention.

With reference to FIG. 3, FIG. 3 is a schematic diagram of a fingerprint identification layer 12 according to an embodiment of the present invention. The fingerprint identification layer 12 is formed on the second insulating layer 24 and includes a fingerprint identification array 121 and a plurality of fingerprint identification leads 122 (indicated by thick lines for convenience of distinction). The fingerprint identification array 121 includes a plurality of fingerprint identification units 1211. In order to implement a touch display panel with a fingerprint identification function, each of the fingerprint identification units 1211 is preferably formed into a conductor grid (not shown) with high light transmittance by a plurality of staggered wires, so that the fingerprint identification array 121 can be integrated in the display panel without impacting display function. In an embodiment (referring to FIG. 2), light emitted by a plurality of sub-pixels (not shown) is irradiated from the substrate 21 toward the fingerprint identification layer 12. Since the touch electrodes 11 are made of a transparent conductive material, and each of the fingerprint identification units 1211 in the identification array 121 is a conductor grid with high light transmittance, light emitted by the plurality of sub-pixels can be transmitted to a surface of the display panel.

In this embodiment, the wires may be made of materials selected from one or an alloy of magnesium (Mg), aluminum (Al), titanium (Ti), niobium (Nb), neodymium (Nd), copper (Cu), and silver (Ag). The shape of the conductor grid includes, but is not limited to, the shape shown in FIG. 3. In addition, since a distance between a ridge and a valley of a fingerprint is about 300 micrometers to 400 micrometers, in order to ensure the accuracy of fingerprint identification, the present invention preferably sets a side length of each of the fingerprint identification units 1211 to not more than 50 micrometers. It can be understood that the size of each of the fingerprint identification units 1211 is only a preferred size provided by the present invention, and should not be construed as a limitation on the present invention.

In this embodiment, each of the fingerprint identification leads 122 is electrically connected to a conductor grid in part of the fingerprint identification units 1211, that is, the fingerprint identification array 121 is electrically connected to a plurality of fingerprint identification leads 122, for example, as shown in FIG. 3, the fingerprint identification leads 122 arranged in a row direction are electrically connected to the conductor grids arranged in the row direction, and the fingerprint identification leads 122 arranged in a column direction are electrically connected to the conductor grids arranged in the column direction. It can be understood that FIG. 3 illustrates a connection relationship between the plurality of the fingerprint identification leads 122, whose arrangement can be placed according to requirements, and this should not be construed as a limitation on the present invention. In an embodiment, each of the fingerprint identification units 1211 may have at least one fingerprint identification pin (as shown by the dashed box in FIG. 3, wherein the dashed box is only used for marking and does not represent the structure of the present invention) to assist the connection between the fingerprint identification leads 122 and the conductor grids.

Figure 4:
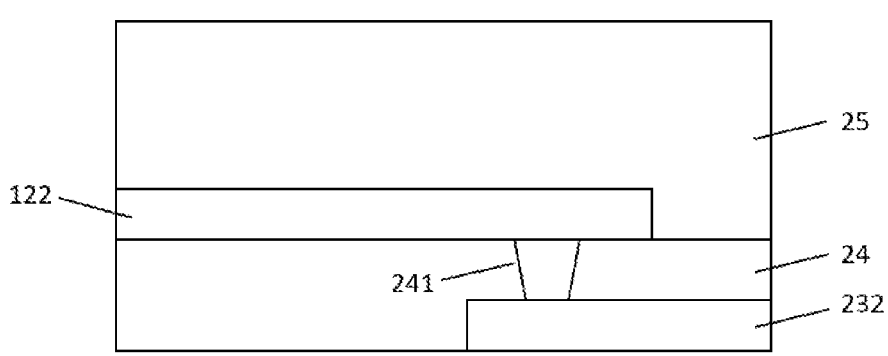
FIG. 4 is a schematic diagram of connections between fingerprint identification leads and fingerprint identification traces according to an embodiment of the present invention.

With reference to FIG. 4, FIG. 4 is a schematic diagram of connections between a fingerprint identification leads 122 and fingerprint identification traces 232 according to an embodiment of the present invention. When a finger is placed on a screen of the touch display panel corresponding to the fingerprint identification array 121, the fingerprint identification array 121 will generate a fingerprint identification signal. In order to communicate the fingerprint identification signal to a binding area 14 which is connected to an external integrated circuit (IC) or a flexible printed circuit board (FPC) for fingerprint identification, the present invention connect the fingerprint identification leads 122 (indicated by thick lines for convenience of distinction) to the fingerprint identification lines 232 (in order to facilitate the distinction, which are indicated by thin lines) through via holes 241 (in order to facilitate the distinction, which are indicated by circle symbols, which do not represent the structure of the present invention). Specifically, the via holes 241 are provided at positions of the second insulating layer 24 corresponding to the fingerprint identification lines 232, and the plurality of fingerprint identification leads 122 connected to the fingerprint identification array 121 are connected to the plurality of fingerprint identification lines 232, as shown in FIG. 4.

In an embodiment, when a finger is placed on the touch screen corresponding to the fingerprint identification array 121, the touch electrodes 11 and the fingerprint identification array 121 will simultaneously generate a touch signal and a fingerprint identification signal respectively. In order to distinguish these signals to correctly determine whether the touch display panel is in a fingerprint identification mode or a touch mode at this time, a driving chip (not shown) connected to the binding area 14 can be used to distinguish the touch signal from the fingerprint identification signal.

The present invention integrates fingerprint identification into a touch display panel through a conductor grid with high light transmittance, and realizes a touch panel with a fingerprint identification function. Furthermore, in addition to using a conductive layer 23 as the bridge line layer 231 of adjacent ones of the first touch electrodes 1121, a plurality of fingerprint identification leads 122 in connection with the fingerprint identification array 121 are electrically connected to a plurality of fingerprint identification traces 232 by forming via holes 241 in the second insulating layer 24, and are connected to a binding area 14 for fingerprint identification, to make the most of the conductive layer. It can be seen that the present invention has a high degree of industrial applicability, and its inventive step is very significant.

While the present invention has been described by way of example and in terms of the preferred embodiments, it is to be understood that the present invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A touch display panel with a fingerprint identification function, comprising:
    a substrate;
    touch electrodes disposed on the substrate and comprises a plurality of first touch electrodes and a plurality of second touch electrodes, wherein adjacent ones of the first touch electrodes are electrically connected to each other, adjacent ones of the second touch electrodes are electrically connected to each other, and the plurality of first touch electrodes and the plurality of second touch electrodes are staggered and insulated from each other;
    a first insulating layer covering the substrate and the touch electrodes;
    a conductive layer disposed on the first insulating layer and comprising a bridge line layer and a plurality of fingerprint identification traces, wherein the bridge line layer is configured to electrically connect the adjacent ones of the first touch electrodes;
    a second insulating layer covering the conductor layer and the first insulating layer;
    a fingerprint identification layer disposed on the second insulating layer and comprising a fingerprint identification array and a plurality of fingerprint identification leads, wherein the fingerprint identification array has a plurality of fingerprint identification units, and each of the fingerprint identification leads is electrically connected to at least one of the plurality of the fingerprint identification units; and
    a protective layer disposed on the fingerprint identification layer,
    wherein the second insulating layer is provided with via holes at positions corresponding to each of the fingerprint identification traces, and the plurality of fingerprint identification leads are electrically connected to the plurality of fingerprint identification traces through the via holes.

2. The touch display panel according to claim 1, wherein the substrate is a thin film transistor array substrate.

3. The touch display panel according to claim 1, wherein each of the fingerprint identification units has a conductor grid constituted by staggering a plurality of wires.

4. The touch display panel according to claim 1, wherein a side length of the fingerprint identification array is not less than 1.5 cm.

5. The touch display panel according to claim 3, wherein a side length of the conductor grid is not greater than 50 microns.

6. The touch display panel according to claim 3, wherein the conductor grid is made of a material selected from one or an alloy of magnesium, aluminum, titanium, niobium, neodymium, copper, and silver.

7. The fingerprint identification touch display panel according to claim 3, wherein the first touch electrodes and the second touch electrodes are made of a material selected from one of indium tin oxide, indium gallium zinc oxide, indium zinc oxide, and indium gallium oxide.

8. The touch display panel according to claim 3, wherein the conductor grid is connected to at least one fingerprint identification pin to assist in connecting each of the fingerprint identification leads to the conductor grid in each of the fingerprint identification units.

9. The touch display panel according to claim 1, wherein each of the touch electrodes is one of a self-capacitive touch electrode or a capacitive touch electrode.

10. A touch display device, comprising the touch display panel with the fingerprint identification function according to claim 1.

* * * * *